P. M. BAWTINHIMER.
POTATO-DIGGER.
No. 171,913. Patented Jan. 11, 1876.
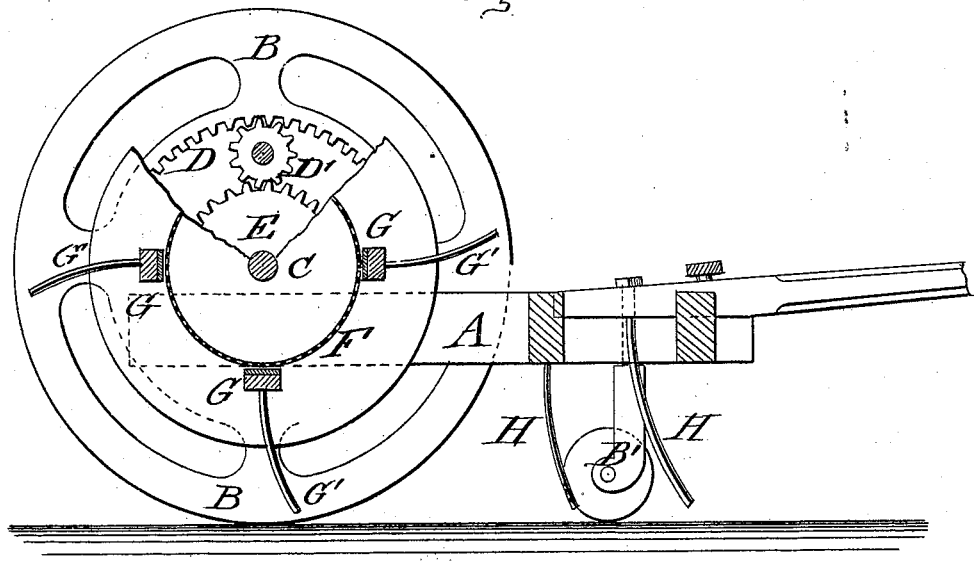
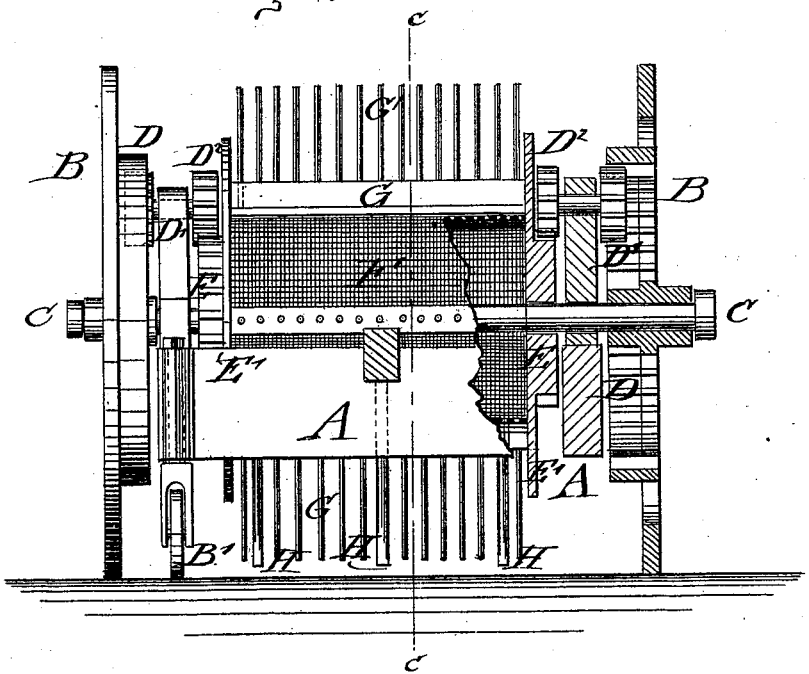
WITNESSES:
Chas. Nida
C. Sedgwick
INVENTOR:
P. M. Bawtinhimer
BY
ATTORNEYS.

UNITED STATES PATENT OFFICE.

PETER M. BAWTINHIMER, OF WOODSTOCK, CANADA.

IMPROVEMENT IN POTATO-DIGGERS.

Specification forming part of Letters Patent No. 171,913, dated January 11, 1876; application filed November 8, 1873.

*To all whom it may concern:*

Be it known that I, PETER M. BAWTINHIMER, of Woodstock, in the Province of Ontario and Dominion of Canada, have invented a new and Improved Potato-Digger, of which the following is a specification:

In the accompanying drawing, Figure 1 represents a sectional side elevation of my improved potato-digger on the line $c\,c$, Fig. 2; and Fig. 2, a sectional front elevation of the same.

Similar letters of reference indicate corresponding parts.

The object of my invention is to furnish, for the use of farmers, an improved machine for digging potatoes, by which the ground is loosened, and the potatoes gathered in a rapid and effective manner.

My invention consists of a cylindrical drum of strong wire-gauze or other suitable material, which is supported by a suitable frame, and rotated by the wheels of the same. Lateral supporting-arms with radial curved tines are applied to the cylinder for raking the ground, and gathering and sifting the potatoes, in connection with the drum. Adjustable teeth are connected to the front part of the frame for loosening the earth in advance of the tines.

In the drawing, A represents the frame of the potato-digger, which is hung to the axle C of the hind wheels B, and supported by small front wheels B'. The hind wheels B gear, by projecting cam-wheels D, with pinions $D^1$, which turn in suitable standards or in bearings at the rear part of frame A, and gear, by the additional pinions $D^2$, keyed on the shafts of pinion $D^1$, with cog-wheels E, transmitting rotary motion to cylindrical drum F. The cog-wheels E are cast or otherwise attached to the end disks E' of drum F, which turns freely on the axle C. Drum F is made of strong wire-gauze, reticulated sheet metal, or other suitable material, attached to side disks E', and to four or more lateral arms or bars, G, which are firmly applied to the side disks E'. Each bar G is arranged with a series of strong radially-extending tines, G', which are curved to take up the potatoes and retain them thereon.

The supporting-bars G or the whole drum F may be made adjustable by suitable lever construction, in the usual manner, so that the tines may penetrate the earth to any required depth, and be thrown out of gear in turning, or after the work has been done.

The forward motion of the wheels B causes the rapid descent of the tines, which dig into the ground, carry the potatoes with them, and sift the earth in their upward motion. The potatoes are, by the rotation of the drum, transferred from the tines to the grate-like surface of the drum, and cleaned from the adhering sand or earth, which passes through the drum to the ground.

From the drum the potatoes may be either deposited on the ground in the track of the drum, or into a box or other receptacle connected to the rear of frame A.

Three or more teeth, H, are applied to frame A in front of the drum, for breaking up the earth when it may be too hard for the tines. These teeth may also be made adjustable, so that they can be lowered or raised by the driver.

The machine is drawn by a team of horses, and performs its work rapidly, without getting out of order or injuring the potatoes.

Having thus described my invention, I claim as new and desire to secure by Letters Patent—

The combination of a convex grate, arranged so as to form a complete cylindrical grate, together with the long, narrow, and slightly-curved tines, as described in the foregoing specification.

PETER M. BAWTINHIMER.

Witnesses:
 W. R. BAKER,
 JNO. LEWIS.